(12) United States Patent
Dunsky

(10) Patent No.: US 8,145,511 B2
(45) Date of Patent: Mar. 27, 2012

(54) SYSTEM AND METHOD FOR LOCATING AIRCRAFT PASSENGERS

(75) Inventor: Ron Dunsky, Brooklyn, NY (US)

(73) Assignee: PASSUR Aerospace, Inc., Stamford, CT (US)

( * ) Notice: Subject to any disclaimer, the term of this patent is extended or adjusted under 35 U.S.C. 154(b) by 1521 days.

(21) Appl. No.: 11/192,576

(22) Filed: Jul. 29, 2005

(65) Prior Publication Data

US 2007/0276706 A1 Nov. 29, 2007

Related U.S. Application Data

(60) Provisional application No. 60/592,608, filed on Jul. 30, 2004.

(51) Int. Cl.
*G06Q 10/00* (2012.01)
(52) U.S. Cl. .......................................................... 705/5
(58) Field of Classification Search ........................ None
See application file for complete search history.

(56) References Cited

U.S. PATENT DOCUMENTS

| | | | | |
|---|---|---|---|---|
| 5,913,912 A | * | 6/1999 | Nishimura et al. | 701/35 |
| 6,003,009 A | * | 12/1999 | Nishimura | 705/5 |
| 2003/0233244 A1 | * | 12/2003 | Kumhyr | 705/1 |
| 2004/0104824 A1 | * | 6/2004 | Cole et al. | 340/971 |

* cited by examiner

*Primary Examiner* — John Hayes
*Assistant Examiner* — Tonya Joseph
(74) *Attorney, Agent, or Firm* — Fay Kaplun & Marcin, LLP

(57) ABSTRACT

The present invention is directed to system and method for locating aircraft passengers. A data feed arrangement receives aircraft data points from at least one first data source and passenger information from a second data source. A data processing arrangement stores each aircraft data point in a flight record and generates a flight track for the aircraft using data stored in the flight record. The data processing arrangement also receives passenger information and matches passenger information with corresponding flight records. A data distribution arrangement organizes the flight track and passenger information into a displayable file, wherein the displayable file includes a mechanism to search for specific passenger information.

17 Claims, 6 Drawing Sheets

US 8,145,511 B2

SYSTEM AND METHOD FOR LOCATING AIRCRAFT PASSENGERS

INCORPORATION BY REFERENCE

This application claims the benefit of U.S. Provisional Patent Application 60/592,608 filed on Jul. 30, 2004 and entitled "System and Method for Locating Aircraft Passengers" and is expressly incorporated herein, in its entirety, by reference.

BACKGROUND INFORMATION

At times, individuals, corporations or other entities may desire to identify passengers on an aircraft that is or was recently in flight. For example, an individual who is picking up a relative at an airport may wish to verify that the relative has communicated correct flight information (e.g., flight number, arrival time, arrival airport, etc.) and that none of the flight information has since changed (e.g., delayed flight, etc.). In another example, a corporation may wish to determine which of its employees are on a business trip to a particular destination. A further example may be a situation where an individual desires to determine a type of aircraft flying overhead in order to decide upon a subsequent course of action. That is, by identifying the passengers onboard, the individual may know whether the aircraft is a commercial airplane, a chartered flight, or a government aircraft. Thus, the individual may take an appropriate course of action, such as reporting an unusual activity of the aircraft or expecting a repeated sighting of the aircraft. However, at present there is no system for an individual to identify passengers on an aircraft in flight.

SUMMARY OF THE INVENTION

The present invention is directed to system for locating aircraft passengers comprising a data feed arrangement to receive aircraft data points from at least one first data source and passenger information from a second data source, a data processing arrangement to store each aircraft data point in a flight record and generate a flight track for the aircraft using data stored in the flight record, the data processing arrangement also receiving passenger information and matching passenger information with corresponding flight records, and a data distribution arrangement to organize the flight track and passenger information into a displayable file, wherein the displayable file includes a mechanism to search for specific passenger information.

The present invention is also directed to method for locating aircraft passengers comprising the steps of collecting aircraft data points from a first data source and passenger information from a second data source, storing each aircraft data point in a flight record and generating a flight track for the aircraft using data stored in the flight record, matching passenger information with corresponding flight records, and creating a displayable file including the flight track and passenger information, wherein the displayable file includes a mechanism to search for specific passenger information.

DETAILED DESCRIPTION

The present invention comprises a system and method for transmitting, receiving, and displaying aircraft passenger information. The system includes delivery of information to users via a communications network which may be, for example, the Internet, a corporate intranet, etc. The information that is provided to the users may include the location(s) of aircraft passengers or groups of passengers and the corresponding aircraft (e.g. airplane, helicopter). Locations and additional information for the passengers and aircraft may be superimposed on a graphical map. The exemplary embodiment of the present invention is described as a web based system. However, those of skill in the art will understand that there may be any number of other manners of implementing the present invention in embodiments that are not web based.

The present invention provides an accurate manner of identifying passengers and the flight status associated with a flight on which the passenger is traveling. The exemplary embodiment of the present invention is described with reference to flight status data being provided by the PASSUR® System sold by Megadata Corporation of Bohemia, N.Y. The PASSUR System provides highly precise flight tracking information using a unique set of algorithms and a high density and update rate of collected data. By combining this data with accurate passenger information (e.g., a passenger list), the exemplary embodiment of the present invention provides users with detailed information about a passenger and the flight on which the passenger is traveling. Specifically, the PASSUR System allows for detailed flight tracks to be presented to a user. The data presented within the displayable flight tracks allows for a user to have a detailed presentation of various flight information. The combination of this detailed displayable flight information with searchable passenger information provides a unique presentation of data as will be described in greater detail below. The present invention is not limited to using PASSUR flight data.

Figure 1:
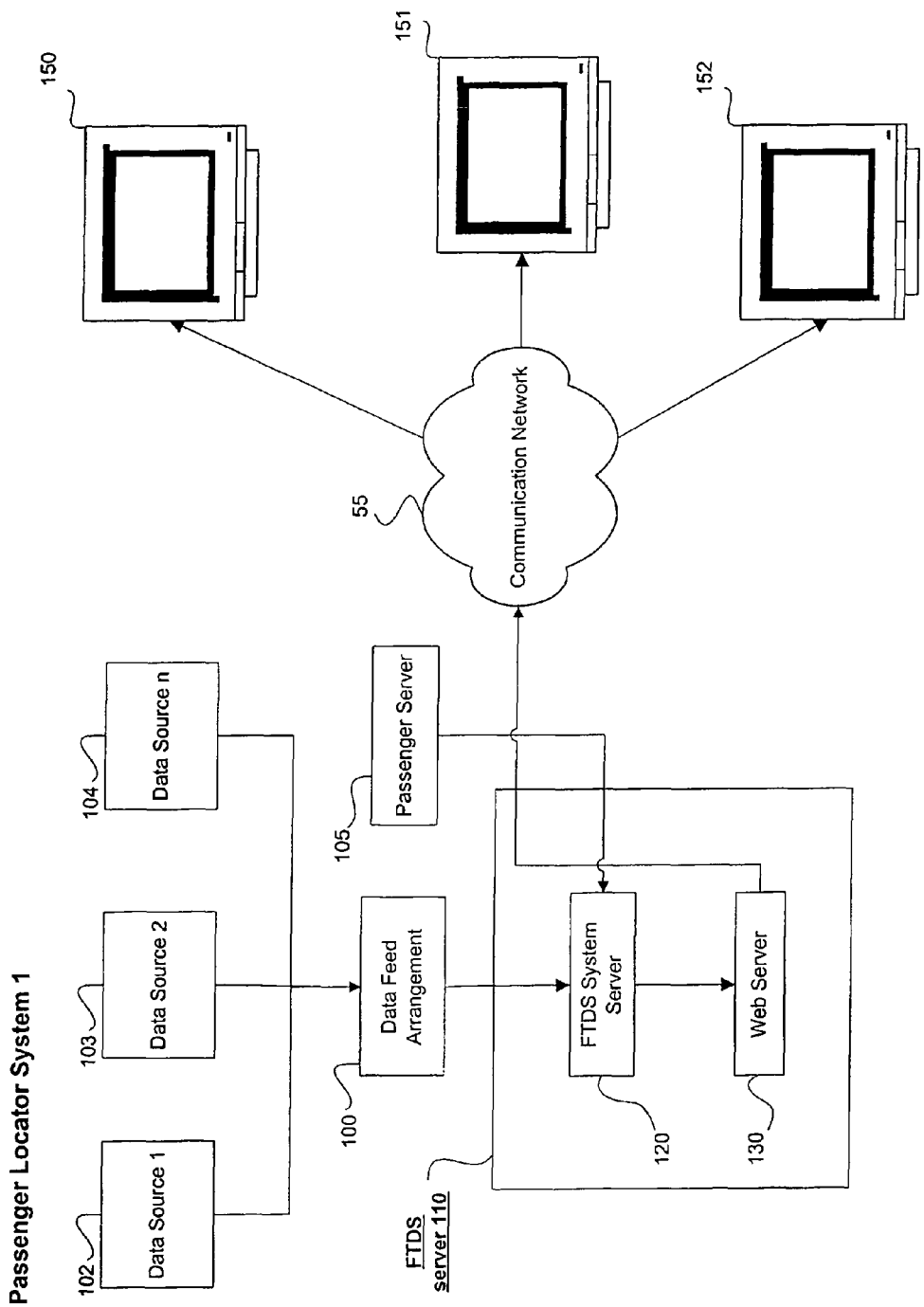
FIG. 1 shows an exemplary system according to the present invention.

FIG. 1 shows an aircraft passenger locator system 1 according to the present invention. According to the system 1, a data feed arrangement 100 may obtain data, which is used to generate aircraft locations. The data may be received from any number of data sources (e.g., data source 1 (102), data source 2 (103), data source n (104)), which may provide information regarding an aircraft in flight. The data feed arrangement 100 may be connected to a flight tracking display system ("FTDS") server 110, which may include, for example, the FTDS System server 120 software and web server 130 software. A passenger server 105 may be connected to the FTDS system server 120. The FTDS server 110 may be coupled to a communications network 55 (e.g., the Internet), enabling transmission of data to a plurality of users 150, 151, 152.

The data sources 102-104 may include active radar systems, Secondary Surveillance Radar ("SSR"), and/or Passive Secondary Surveillance Radar ("PSSR"). A PSSR system may be, for example, the PASSUR® System sold by Megadata Corporation of Bohemia, N.Y. In a PSSR system, one or more PSSRs are generally placed at known distances and directions from a SSR system at an airport. A PSSR system uses time relationships between received signals (i.e., interrogations and responses), the known distances from the SSR system, and the known direction from each PSSR to the SSR, to determine the location of aircraft relative to a reference location, e.g., the airport. Using additional PSSRs in the system may increase an accuracy of a location determination. Some PSSR systems use a technique called multilateration to determine the location of aircraft. PSSR may receive a beacon code and altitude data from the received signals and calculate aircraft position (e.g., range, azimuth) and ground speed based on the timing of the receipt of the signals and the known radar locations. The data sources 102-104 may also include other primary data sources (e.g., an Aircraft Situation Display ("ASD") data source). Data received from ASD systems may include near real-time location data of aircraft based on Federal Aviation Administration ("FAA") and other air traffic control system radar position reports. Further, the data sources 102-104 may include secondary data sources (e.g., airline schedule information, etc.).

The data feed arrangement 100 receives aircraft data points from the data sources 102-104. Aircraft data points may include information about each aircraft being tracked by the system 1. For example, as in a PSSR system, aircraft data points may include a track identification, a time, an aircraft position, altitude, aircraft velocity (e.g., 3-D velocity calculated using x, y, z components), a ground speed, an aircraft type, etc. For a further example, ASD aircraft data points may include similar information to PSSR, and may additionally include the aircraft's flight number and details of the aircraft's filed flight plan. The details of the filed flight plan may include a departure airport, a destination airport, an estimated time of arrival, etc. The aircraft data points may be transferred to the FTDS server 110 using any standard data format, for example, an ASCII format, a text format, etc. The aircraft data points which are input into the FTDS server 110 may also be updated at a time interval dependent on the data system (e.g. PSSR, ASD).

The data feed arrangement 100 may input data (i.e., the data points) into the FTDS server 110. The data may be updated based on the type of system used for the data feed arrangement 100. For example, PASSUR® System provides real-time data updates at short time intervals (e.g., every 4.6 seconds), whereas the ASD data set is updated at a slower interval of 1-4 minutes. Those of skill in the art will understand that a single sweep of radars associated with the data feed arrangement 100 may produce a plurality of target data points depending on the number of aircraft in the range of the tracking radar.

The aircraft data points for an individual flight may be combined by the FTDS system server 120 into a flight record. If the data feed arrangement 100 supplies aircraft data points from multiple sources, the aircraft data points are compared to merge aircraft data points from either source that correspond to the same aircraft. Depending on the sources, there are multiple manners of correlating and combining data points. For example, to correlate PSSR and ASD data points, the time and location contained in the data points may be compared. Each aircraft data point is then filtered to determine whether the aircraft data point is associated with a currently displayed flight track. If the aircraft data point is associated with a previously displayed flight track it is added to the flight record for that aircraft. If the received aircraft data point does not belong to a currently displayed flight track, the FTDS system server 120 software may create a new flight record for a new flight track.

A passenger server 105 may be connected to the FTDS system server 120. The passenger server 105 may be included in the FTDS server 110 or may be located external to the FTDS server 110. The passenger server 105 may also be one of the various data sources which provide information to the data feed arrangement 100. However, in this example it will be considered that the passenger server 105 is a separate entity. For example, the passenger server 105 may be an airline ticketing server, a travel agency server (e.g. an online travel reservation server), a corporation's employee travel database, or any other server or travel information database known to those of ordinary skill in the art. The FTDS system server 120 may receive passenger records from the passenger data server 105. Each passenger record may include, for example, a passenger name, a departure airport, a destination airport, and airline flight numbers. The passenger record may include additional information such as, a passenger seat assignment, passenger contact information, destination hotel information, etc. In one embodiment of the present invention, the passenger record may even include an image of the passenger. The image may be a live picture of the passenger in his/her seat, or it may be a stored photograph such as a picture scanned from a photo identification.

The FTDS system server 120 may match passenger records received from the passenger server 105 with flight records generated from the data source data points. For example, the FTDS system server 120 may match a passenger's flight number contained in a passenger record with a corresponding flight number received in an aircraft data point. In one exemplary embodiment of the present invention, the FTDS system server 120 may store each passenger record in the corresponding flight record. In another exemplary embodiment, the FTDS system server 120 may store a reference to a flight record in a corresponding passenger record in the passenger server 105. As one of ordinary skill in the art will understand, the FTDS system server 120 may repeatedly perform the match function in regular time intervals to provide updated passenger and flight information.

The FTDS server 110 may contain web server 130 software to distribute the flight tracks and passenger information to users 150-152 of the FTDS system 1. For example, a flight track and corresponding passenger records generated by the FTDS system server 120 may be transmitted as a displayable file (e.g., a graphical user interface) to the plurality of users 150-152 via the communications network 55. Accordingly, the web server 130 software may host a web page containing the necessary data and information to display the tracking information. The users 150-152 may operate a web browser such as Microsoft's Internet Explorer, Netscape Navigator, or other third-party web browsing software which may access the web page hosted by web server 130 software. As the user 150-152 remains connected to the FTDS server 110, the web server 130 software will continue to deliver data to update the flight tracks on the user's screen. The update may be performed automatically each time the FTDS server 110 receives updated information from the data feed arrangement 100 or the passenger server 105.

According to the present invention, a user 150-152 may perform a search to locate desired information in the displayable file. For example, a user 150-152 may desire to locate a particular passenger, although the user 150-152 is not aware of which aircraft the passenger is aboard. Accordingly, the user 150-152 may input information (i.e., enter a keyword) to find the passenger. The information may include a passenger name, a departure airport, an arrival airport, etc. In another example, the user 150-152 may desire to perform a search using information relating to the aircraft, such as a flight number, a departure time, an arrival time, etc. A search performed by the user 150-152 may return a list of hits which match the input information. Accordingly, the user 150-152 may locate the desired aircraft and/or passenger.

The user 150-152 may also select to narrow the information displayed by the displayable file. For example, a user 150-152 may wish to only view passenger aircrafts traveling along the East coast. Accordingly, the user 150-152 may zoom in on an area of the displayable file which corresponds to the desired geographical area and/or the user 150-152 may select to eliminate representations of other aircraft from the display.

Figure 2:
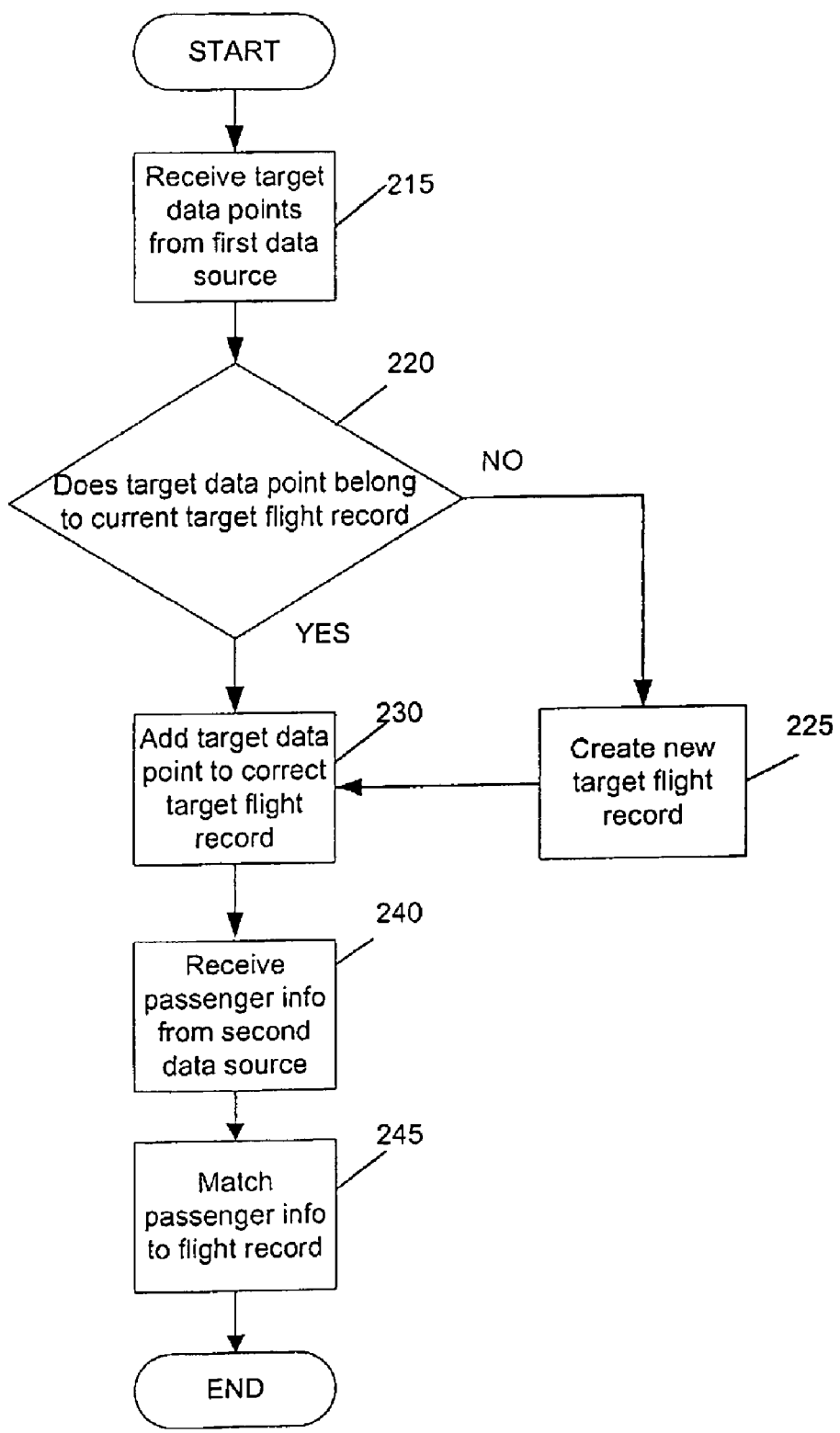
FIG. 2 shows an exemplary method according to the present invention.

FIG. 2 shows an exemplary method 200 for locating aircraft passengers. The method 200 will be described with reference to the system 1 of FIG. 1. However, it will be understood by those of skill in the art that the method 200 may be implemented on any number of modified or alternative systems. In step 215, the FTDS System server 120 receives target data points (e.g., the aircraft data points) from a first data source (e.g., the data feed arrangement 100). The first data source may be one source or it may actually comprise a plurality of data sources, such as the data sources 102-104. The target data points may include information about an aircraft being tracked by the system 1 of FIG. 1.

In step 220, the FTDS System server 120 determines whether each of the newly received target data points corresponds to a current flight track. That is, it is determined whether there is a target flight record with which the target data point is associated. If it is determined that the target data point does not correspond to a current target flight record, a new target flight record for a new flight track is created (step 225). Once the new target flight record is created, it is associated with the target data points, and thus the method 200 continues to step 230 where the target data point is added to the corresponding target flight record. If the target data point corresponds to a target flight record, the method skips step 225 and proceeds directly to step 230 to add the target data point to the target flight record.

In step 240, the FTDS system server 120 receives passenger information from a second data source (e.g., the passenger server 105). The passenger information may include any data which facilitates identification and location of a passenger. In particular, it may be preferable to include data by which a user 150-152 may search to locate the passenger and the corresponding flight record, such as a passenger name or an airline flight number. Other examples of passenger information may include a departure airport, a destination airport, a passenger seat assignment, passenger contact information, destination hotel information, a passenger image, etc.

In step 245, the passenger information is matched to the target flight record. The passenger information may be matched to a correct target flight record using any information included in the passenger information and the target flight record. In one example, the passenger information may include a flight number and the target flight record may also include a flight number. Thus, the two sets of information may be matched based on the flight number. In another example, the passenger information may include an airplane, a departure time, and a departure city. The target data may include the airline and data which indicates the direction of the flight and a scheduled arrival time. In such a case, the FTDS server may be able to determine from the different information that the passenger information corresponds to a particular flight record. Thus, the above examples illustrate that the match may be based on a direct match between specific data or an inferred match based on different data.

The matched passenger information and target flight record may then be organized into a displayable file, which may be transmitted to one or more users (e.g., the users 150-152) via the communications network 55. In one embodiment of the present invention, the displayable file may be, for example, HTML code or applets. Thus, when a user 150-152 connects to the FTDS server 110 via communications network 50, the web server 130 software may send a FTDS applet to the user 150-152 to enable the user 150-152 to display the flight track data and passenger information sent from the FTDS server 110. The applet code transferred to the user 150-152 may be executed by the user's browser to display the tracking information. As the user 150-152 remains connected to the FTDS server 110, the web server 130 software will continue to deliver data to update the flight tracks and/or passenger information on the user's screen. The update may be performed automatically each time the FTDS server 110 receives updated information from the data feed arrangement 100 and/or the passenger server 105. For example, if the PASSUR® System is used as the data feed arrangement 100, the updates may occur approximately every 4.6 seconds, i.e., a time that the FTDS server 110 receives updates from the PASSUR® System plus the processing and data transmission times. The data may be formatted by the FTDS server 110 and delivered to the web browser of the users 150-152 in any standard web browser readable format, for example, HTML format, Java, Java Script, etc.

Figure 3:
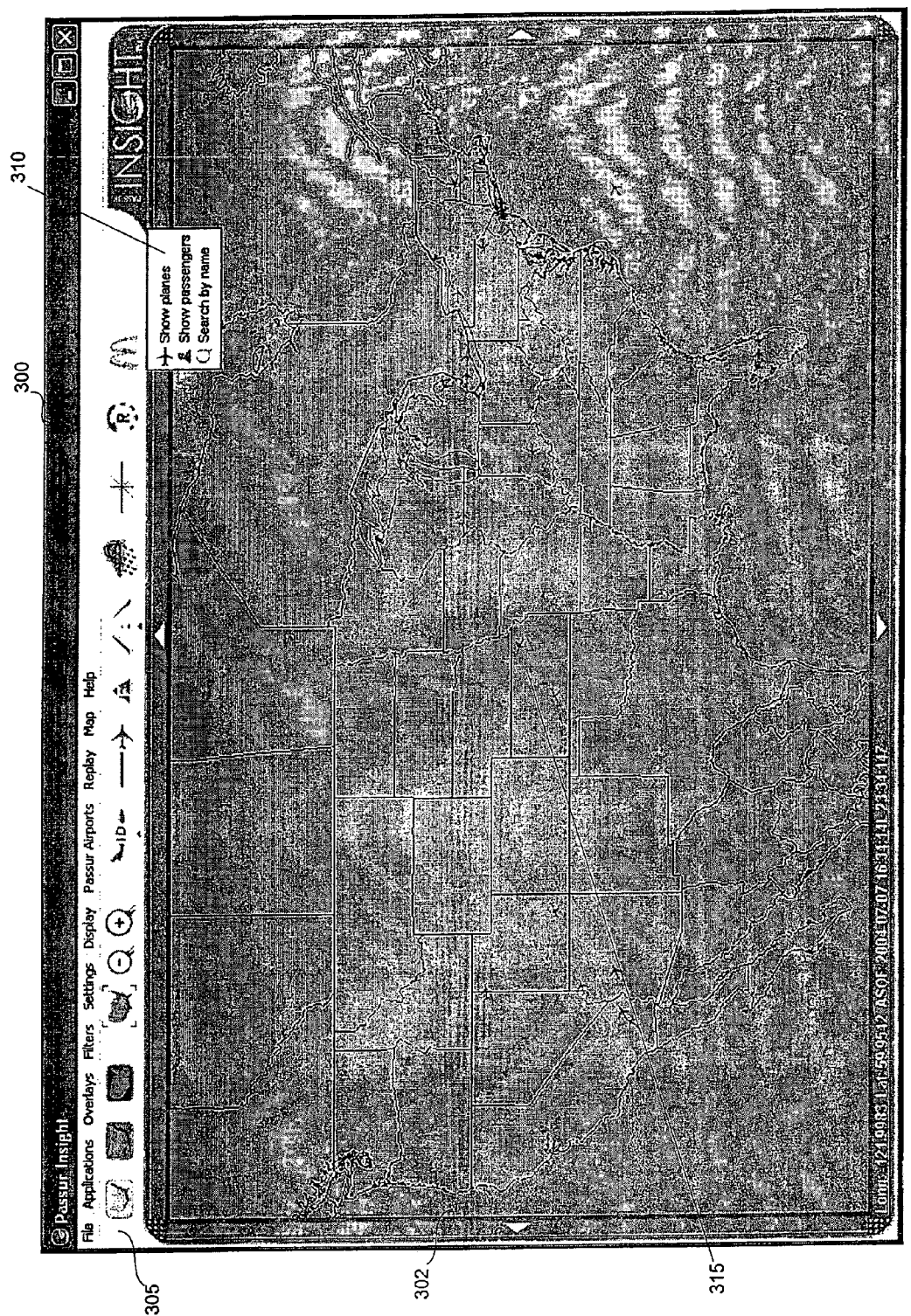
FIG. 3 shows a first exemplary screen display according to the present invention.

FIG. 3 shows an exemplary embodiment of a display 300 according to the present invention. The display may include a map portion 302, a tool bar 305, and a locator 310. The map portion 302 may include several aircraft icons, e.g. aircraft 315, corresponding to aircraft currently being tracked by the passenger locator system 1. The map portion 302 may include only aircraft on which specified passengers are traveling, all aircraft identified by the data sources, or any other combination of aircraft selected by the user. The tool bar 305 may allow a user to change the appearance of the map portion 302 (e.g., zoom, filters, etc), apply overlays to the map portion (e.g., roads, weather, etc), and replay aircraft and passenger information from a earlier time period. The locator 310 may allow a user to choose specific information to display at a given time, e.g. "show planes" and "show passengers." The locator 310 may also include a "search by name" function to locate a specific passenger or group of passengers.

Figure 4:
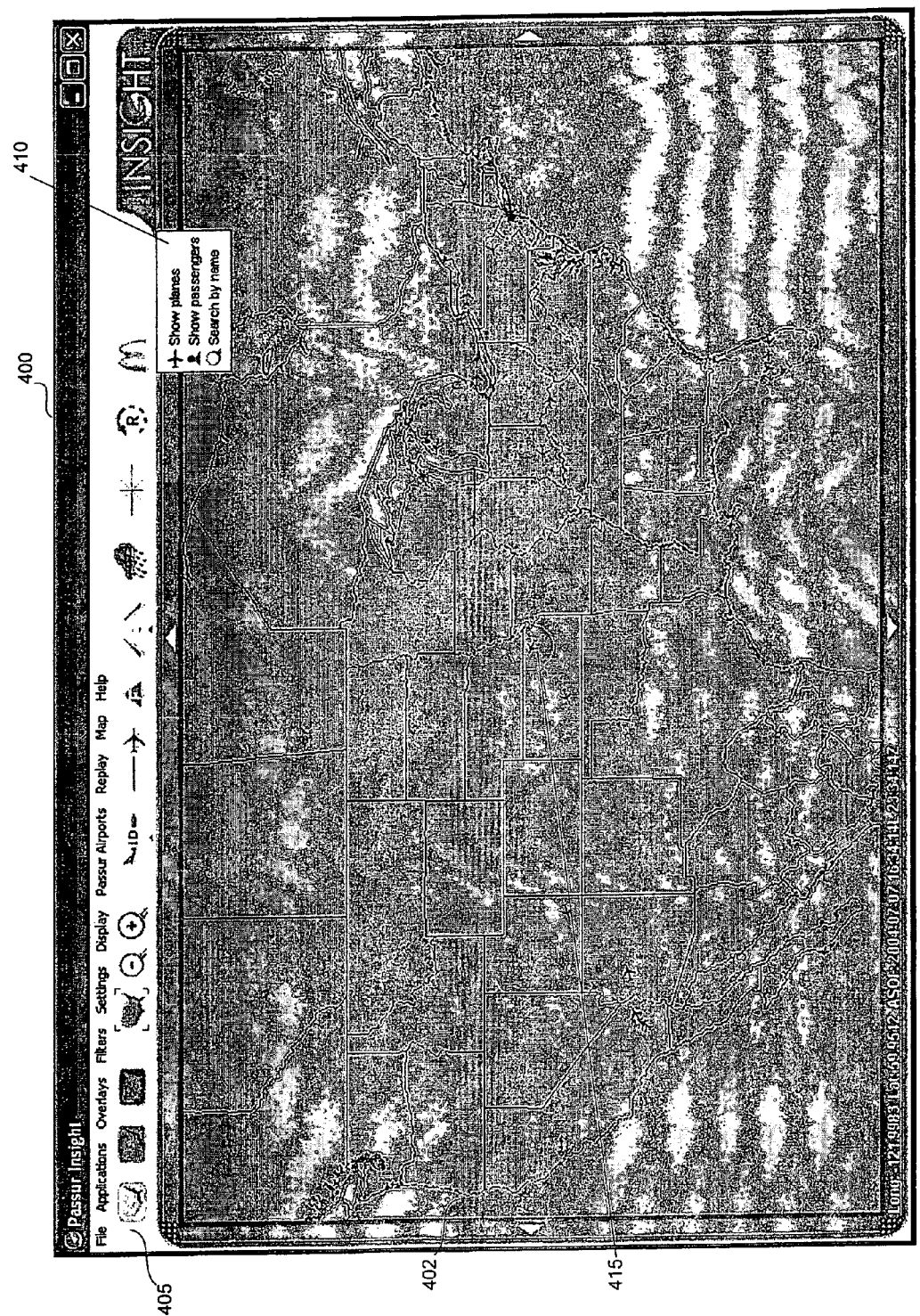
FIG. 4 shows a second exemplary screen display according to the present invention.

FIG. 4 shows another exemplary embodiment of a display 400 according to the present invention. The display 400 includes the map portion 402 and the locator 410. A user may select "show planes" from the locator 410 to display aircraft on which specified individuals are traveling. For example, a corporation may maintain a passenger server 105 on an internal network or intranet including passenger records and information on each employee currently traveling. The passenger server 105 may include each employee's name, itinerary, and additional information, e.g. flight numbers, destination, and contact information. Shown on FIG. 4, the "show planes" function may designate an aircraft 415 on the display 400 with a circle indicating that an employee or a group of employees listed in the passenger server 105 are currently traveling on the aircraft 415. The passenger locator system 1 may also employ other means to designate or highlight an aircraft including, but not limited to, changing a depicted color of the aircraft 415, filtering non-designated aircraft, or any other means known to those of ordinary skill in the art.

Figure 5:
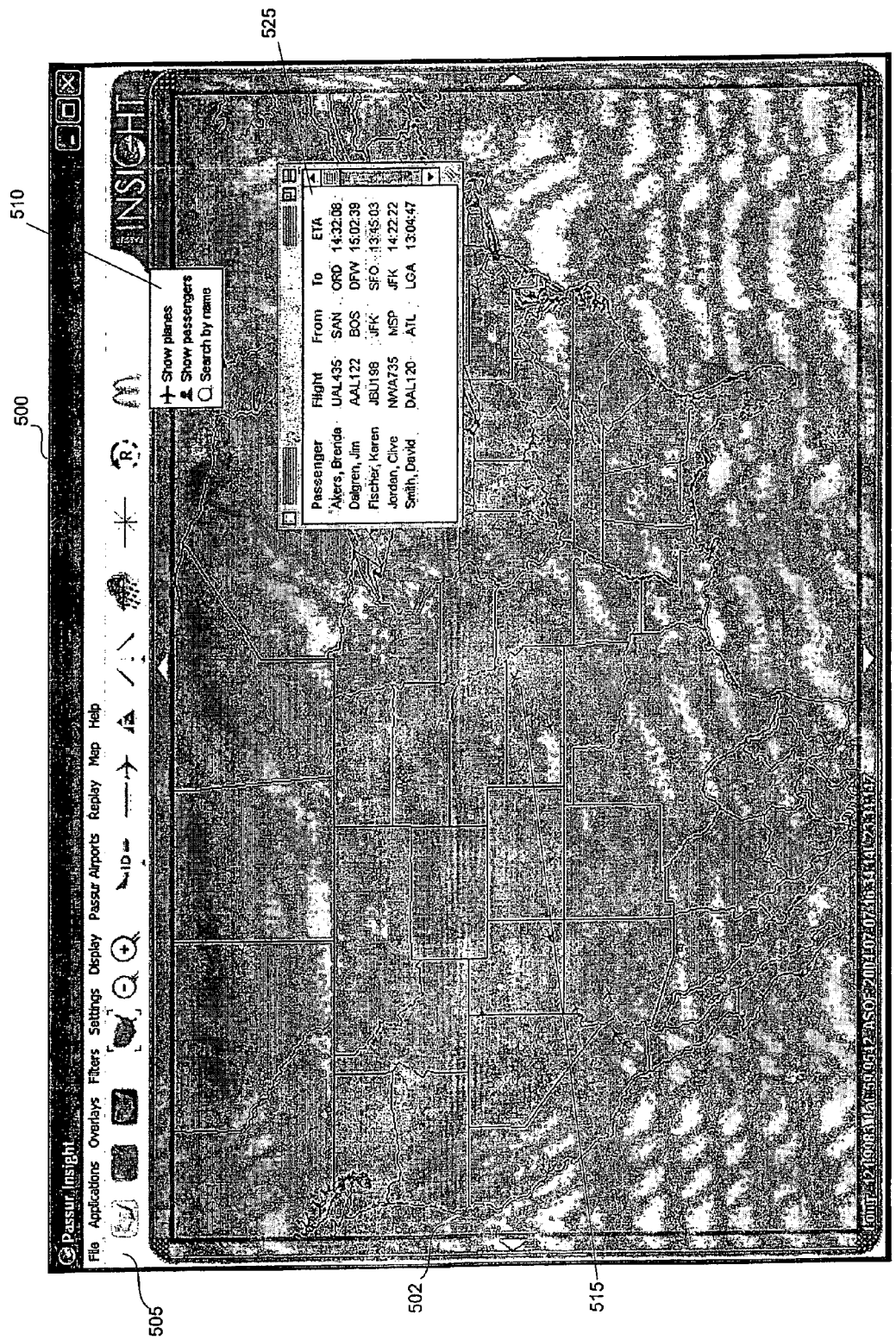
FIG. 5 shows a third exemplary screen display according to the present invention.

FIG. 5 shows another exemplary embodiment of a display 500 according to the present invention. This exemplary embodiment includes the locator 510 and a passenger list 525. A user may select "show passengers" from the locator 510 to display the passenger list 525. The passenger list 525 may include, for example, all or a select group of passengers identified from the passenger server 105. As shown in FIG. 5, the passenger list 525 may include passenger names, flight numbers, departure airport, destination airport, and estimated time of arrival. The passenger list 525 may be organized or sorted alphabetically, by flight number, by arrival time, etc. The user may choose to designate or highlight all or some of the aircrafts on which the passengers in the passenger list 525 are traveling. The user may alternatively select a specific passenger from the passenger list 525 to display the location and additional information for the specified passenger.

Figure 6:
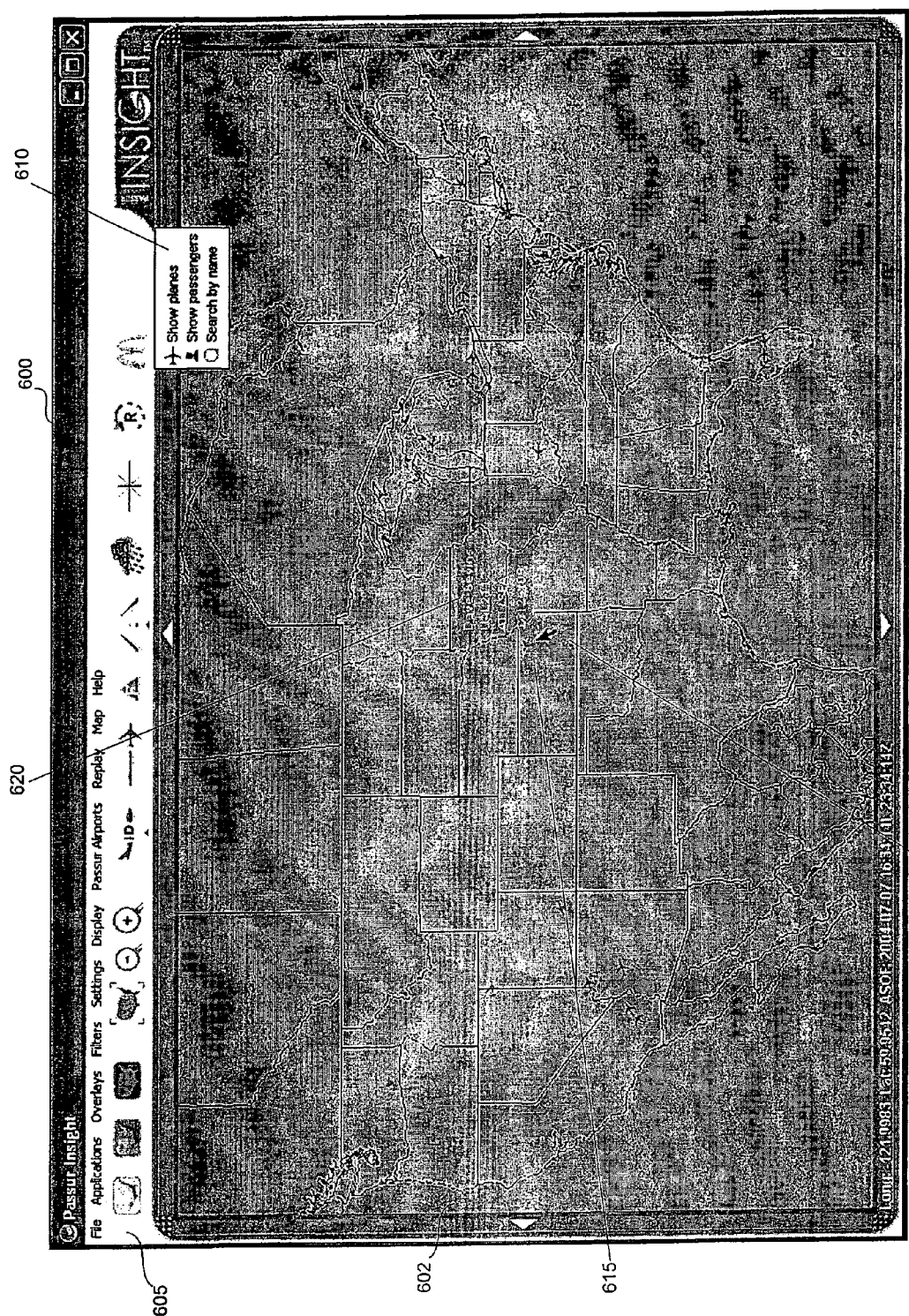
FIG. 6 shows a fourth exemplary screen display according to the present invention.

FIG. 6 shows another exemplary embodiment of a display 600 according to the present invention. This exemplary embodiment includes a locator 610. A user may choose the "search by name" function from the locator 610. The search by name function may allow a user to input and search a passenger using, for example, the passenger's first and/or last name. The search by name function may display passenger's aircraft 615 and a passenger status 620 on the display 600. The passenger status 620 may include the passenger name, flight number, departure airport, destination airport, and estimated time of arrival. The estimated time of arrival may include a time at which the aircraft is scheduled to land or a time at which the passenger may reach his/her final destination. A user may also select an aircraft 615 to display all information related to the aircraft 615. A user may, select the aircraft 615 with a mouse icon 630 and receive, for example, a passenger list 525 (shown in FIG. 5) and/or a passenger status 620.

The present invention may be useful to a corporation to locate and coordinate employees traveling on business. The present invention may also be used by airlines, travel agencies, and travel businesses to locate ticketed passengers and guests. For example, a tour company or resort may maintain a passenger server with passenger records corresponding to incoming guests. Utilizing the present invention, authorized users may access up-to-date information on the arrival of the incoming guests. It is further contemplated that anyone utilizing a web based travel reservation system may allow specified people (e.g., friends and family) access to view their online passenger record and displayed flight track.

The present invention may also prove beneficial in emergency situations. For example, in an unfortunate event of an airplane crash, a user may desire to determine whether any relatives, friends, co-workers, acquaintances, etc. are passengers onboard. Accordingly, the user may locate the airplane via the passenger locator system 1 and immediately view a listing of the passengers onboard. The replay feature of the exemplary embodiment may be used to facilitate the tracking of the plane prior to it experiencing the emergency.

In an exemplary embodiment of the present invention, a user may require authorization before locating a particular passenger. Passengers may wish to secure their information (e.g., name, location, travel plans, etc.), and thus may prevent the information from being displayed to users of the passenger locator system 1. However, the passengers may also want certain individuals to be able to access the information. Thus, a security system may be included in the passenger locator system 1 in order to screen dissemination of passenger information. For example, users may be required to enter an access code (e.g., a password) prior to viewing the passenger information. The access code may be designated by each passenger, and thus may be unique to the passenger. Accordingly, the passengers may communicate the access code only to particular users, whom the passengers wish to be able to view the information. Further, some passengers may decline to set up an access code, and thus their passenger information would be publicly available although the passenger information of others would be secured.

In the preceding specification, the present invention has been described with reference to specific exemplary embodiments thereof. It will, however, be evident that various modifications and changes may be made thereunto without departing from the broadest spirit and scope of the present invention as set forth in the claims that follow. For example, the present invention may be applied to locate passengers traveling by other means, such as on buses, limousines, trains, etc. Further, the present invention may be implemented on systems which are not web based. The specification and drawings are accordingly to be regarded in an illustrative rather than restrictive sense.

What is claimed is:

1. A system, comprising:
   a memory;
   a processor;
   a data feed arrangement to receive aircraft data points from a first data source and passenger information from a second data source;
   a data processing arrangement to store each aircraft data point in a flight record and generate a flight track for the aircraft using data stored in the flight record, the data processing arrangement also receiving the passenger information and, prior to receiving a request for any specific flight track or passenger information, matching the passenger information with a corresponding flight record; and
   a data distribution arrangement to organize the flight track and passenger information into a displayable file, wherein the displayable file includes a mechanism to search for specific passenger information.

2. The system of claim 1, wherein the passenger information includes a passenger name and one of a departure airport, a destination airport, a flight number, a seat assignment, contact information, a destination hotel and an image.

3. The system of claim 1, wherein the data processing arrangement, when matching the passenger information to the flight record, stores the passenger information in the corresponding flight record.

4. The system of claim 1, wherein the data distribution arrangement includes a web server.

5. The system of claim 1, wherein the matching of the passenger information and the flight record is based on common data in the passenger information and the flight record.

6. The system of claim 1, wherein user access to passenger information is limited by a security system.

7. The system of claim 6, wherein the security system includes a password.

8. The system of claim 1, wherein a parameter of the search is one of a passenger name and a flight number.

9. The system of claim 1, wherein the displayable file includes a passenger list.

10. A method, comprising:
    receiving aircraft data points from a first data source and passenger information from a second data source;
    storing each aircraft data point in a corresponding one of a plurality of a flight records;
    generating, by a server, a flight track for each flight record;
    prior to receiving a request for any specific flight track or passenger information, matching, by said server, passenger information with corresponding flight records; and creating a displayable file including the flight track and passenger information, wherein the displayable file includes a mechanism to search for specific passenger information.

11. The method of claim 10, wherein the passenger information includes a passenger name and one of a departure airport, a destination airport, a flight number, a seat assignment, contact information, a destination hotel and an image.

12. The method of claim 10, wherein the matching of the passenger information and the flight record is based on common data in the passenger information and the flight record.

13. The method of claim 10, wherein user access to passenger information is limited by a security system.

14. The method of claim 10, further comprising:
receiving a search including a search parameter; and
searching the passenger information for the search parameter.

15. The method of claim 14, further comprising:
displaying search results on the displayable file.

16. The method of claim 14, wherein the search parameter of the search is one of a passenger name and a flight number.

17. The method of claim 10, wherein the displayable file includes a passenger list.

\* \* \* \* \*